(12) United States Patent
Arquie et al.

(10) Patent No.: US 7,310,774 B1
(45) Date of Patent: Dec. 18, 2007

(54) METHOD FOR DISPLAYING SWITCH PORT INFORMATION IN A NETWORK TOPOLOGY DISPLAY

(75) Inventors: Louis Arquie, Cupertino, CA (US); Larry L. Cornett, Livermore, CA (US)

(73) Assignee: SANavigator, Inc., Broomfield, CO (US)

(*) Notice: Subject to any disclaimer, the term of this patent is extended or adjusted under 35 U.S.C. 154(b) by 477 days.

(21) Appl. No.: 09/846,750

(22) Filed: Apr. 30, 2001

Related U.S. Application Data

(60) Provisional application No. 60/228,515, filed on Aug. 28, 2000.

(51) Int. Cl.
*G06F 15/177* (2006.01)

(52) U.S. Cl. ..................................... 715/734

(58) Field of Classification Search ........ 345/734–736, 345/969, 810–846; 709/220–221, 223–224, 709/238; 370/400, 389, 395.21, 396, 250, 370/407, 408, 825.02, 825.5; 715/734
See application file for complete search history.

(56) References Cited

U.S. PATENT DOCUMENTS

| | | | | |
|---|---|---|---|---|
| 5,179,550 A | * | 1/1993 | Simpson | 370/380 |
| 5,261,044 A | * | 11/1993 | Dev et al. | 345/855 |
| 5,276,789 A | | 1/1994 | Besaw et al. | |
| 5,278,951 A | | 1/1994 | Camacho et al. | |
| 5,408,603 A | | 4/1995 | Van de Lavoir et al. | |
| 5,751,965 A | * | 5/1998 | Mayo et al. | 709/224 |
| 5,825,772 A | * | 10/1998 | Dobbins et al. | 370/396 |
| 5,838,907 A | * | 11/1998 | Hansen | 709/220 |
| 5,910,803 A | | 6/1999 | Grau et al. | |
| 5,951,649 A | * | 9/1999 | Dobbins et al. | 709/238 |
| 5,995,101 A | | 11/1999 | Clark et al. | |
| 6,014,715 A | | 1/2000 | Stoevhase | |
| 6,049,828 A | * | 4/2000 | Dev et al. | 709/224 |
| 6,067,093 A | | 5/2000 | Grau et al. | |
| 6,072,490 A | | 6/2000 | Bates et al. | |
| 6,078,324 A | | 6/2000 | Phathayakorn et al. | |
| 6,078,739 A | | 6/2000 | Paterson et al. | |
| 6,229,538 B1 | | 5/2001 | McIntyre et al. | |
| 6,369,819 B1 | | 4/2002 | Pitkow et al. | |
| 6,456,306 B1 | * | 9/2002 | Chin et al. | 345/810 |
| 6,473,403 B1 | * | 10/2002 | Bare | 370/236 |
| 6,493,755 B1 | * | 12/2002 | Hansen et al. | 709/224 |
| 6,594,696 B1 | * | 7/2003 | Walker et al. | 709/223 |
| 6,650,347 B1 | * | 11/2003 | Nulu et al. | 345/853 |
| 6,845,395 B1 | * | 1/2005 | Blumenau et al. | 709/223 |
| 2001/0009018 A1 | * | 7/2001 | Iizuka | 710/11 |

OTHER PUBLICATIONS

Cisco Systems Inc., "Monitoring a LightStream 2020 Switch," 1989-1997, pp. 4-1/4-51.

* cited by examiner

*Primary Examiner*—Kristine Kincaid
*Assistant Examiner*—Le Nguyen
(74) *Attorney, Agent, or Firm*—Hensley Kim & Holzer, LLC

(57) ABSTRACT

Systems and methods for displaying network node ports and related information in a network topology display. The user is able to clearly view ports of a connection device in the network and to view additional port information, such as the port type and the port number, for connected and unconnected ports of a network connection device. In addition, the user is able to toggle between a "show ports" mode and a "hide ports" mode for each connection device to view detailed information about the connection device ports or to hide the information in order to simplify the display.

60 Claims, 4 Drawing Sheets

METHOD FOR DISPLAYING SWITCH PORT INFORMATION IN A NETWORK TOPOLOGY DISPLAY

CROSS-REFERENCES TO RELATED APPLICATIONS

This application is related to, and claims priority from, U.S. Provisional Patent Application Ser. No. 60/228,515, filed Aug. 28, 2000, entitled "METHOD FOR DISPLAYING SWITCH PORT INFORMATION IN A NETWORK TOPOLOGY DISPLAY," the disclosure of which is hereby incorporated by reference in its entirety.

BACKGROUND OF THE INVENTION

The present invention relates to systems and methods for displaying the topology of a network, such as a storage area network, and more particularly to systems and methods for displaying port information for a switch or other connection device in a network topology display.

Traditionally, network topology displays show only the various nodes representing devices that make up the network, and do not show any information about the individual ports of a connection device such as a switch, hub, router, or any other connection device. In the case of a switch, for example, the links to the switch are all connected directly to the node representing the switch. Attempting to display individual information about each port of the switch ends up either using a lot of space on the computer display screen or making the port representation so small that it is of little value to the user.

Accordingly it is desirable to provide network topology display systems and methods that allow a user to selectively display port information.

SUMMARY OF THE INVENTION

The present invention provides systems and methods for showing an optional view of network device ports, such as switch ports, and information related to these ports, in a network topology display.

The present invention allows the user to clearly view ports of a connection device in the network and to view additional port information, such as the port type and the port number, for connected and unconnected ports. In addition, the present invention allows the user to toggle between a "show ports" mode and a "hide ports" mode for each connection device to view detailed information about the connection device ports or to hide the information in order to simplify the display.

According to an aspect of the present invention, a computer-implemented method is provided for displaying device port information in a network topology display. The method typically includes displaying a device node in a network topology display, the displayed device node representing a connection device in a network, and the connection device having one or more connection ports for connecting to one or more devices in the network, and displaying one or more connection paths coupled to the displayed device node, the connection paths representing connections to the one or more ports of the connection device. The method also typically includes selectively expanding the displayed device node in response to a user selection, wherein the expanded node includes port information for each of the one or more ports having a connection to another device in the network.

According to another aspect of the present invention, a computer-implemented method is provided for displaying device port information in a network topology display. The method typically includes displaying a device node in a network topology display, the displayed device node representing a connection device in a network, and the connection device having one or more connection ports for connecting to one or more devices in the network, and displaying one or more connection paths coupled to the displayed device node, the connection paths representing actual network connections to the one or more ports of the connection device. The method also typically includes, responsive to a user selection, displaying port information for each of the one or more ports having an actual connection to another device in the network.

According to yet another aspect of the present invention, a computer readable medium containing instructions for controlling a computer system to selectively display device port information for a connection device in a network topology display is provided. the computer-readable medium typically includes instructions for displaying a device node in a network topology display, the displayed device node representing a connection device in a network, the connection device having one or more connection ports for connecting to one or more devices in the network, and displaying one or more connection paths coupled to the displayed device node, the connection paths representing actual network connections to the one or more ports of the connection device. The computer-readable medium also typically includes, responsive to a user selection, displaying port information for each of the one or more ports having an actual connection to another device in the network.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DESCRIPTION OF THE SPECIFIC EMBODIMENTS

Figure 1:
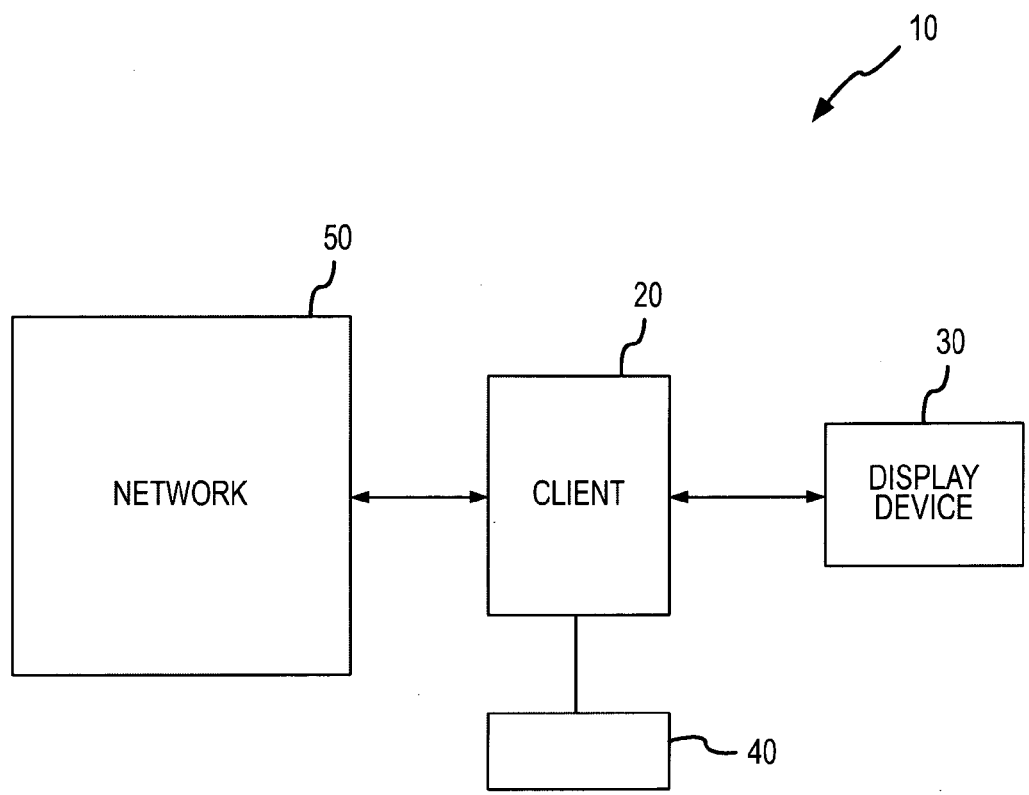
FIG. 1 illustrates an exemplary display system for implementing a network topology display according to the present invention.

FIG. 1 illustrates an exemplary display system 10 suitable for implementing a network topology display according to the present invention. Display system 10 includes client device 20, coupled to, or including display device 30 and user interface device 40. Client device 20 could be a desktop personal computer, workstation, laptop computer, or any other computing device including components capable of interfacing directly or indirectly with the desired network(s) 50 for which a topology display is desired. Network 50 can be a storage area network (SAN), such as a Fibre-channel-based or SCSI-based SAN, or any other type of network. Each client 20 typically runs an application program allowing a user of client 20 to analyze the topology of the network(s) as will be discussed in more detail below. Each client device 20 also typically includes one or more user interface devices 40, such as a keyboard, a mouse, a touchscreen, pen or the like, for interacting with a graphical user interface (GUI) provided by the application program on a display device 30. In general, display device 30 is any device capable of rendering a topology display of the network(s) 50 including, for example, a monitor screen, LCD display, printer, etc.

The application program typically includes computer code run using a central processing unit such as an Intel Pentium processor or the like. Computer code for operating and configuring client 20 as described herein is preferably stored on a hard disk, but the entire program code, or portions thereof, may also be stored in any other memory device such as a ROM or RAM, or provided on any media capable of storing program code, such as a compact disk (CD) medium, a floppy disk, or the like. Additionally, the entire program code, or portions thereof may be downloaded from a software source to client 20 over the Internet as is well known, or transmitted over any other conventional network connection as is well known, e.g., extranet, VPN, LAN, etc., using any communication medium and protocols (e.g., TCP/IP, HTTP, HTTPS, Ethernet, etc.) as are well known. Additionally, portions of the program code may be downloaded or provided to client device 20 and executed on client device 20. In one embodiment, portions of the program code are executed simultaneously at different locations (e.g., one or more clients 20 are connected to one or more servers) and the communication between the different parts is transmitted over the Internet or other network connection/medium.

Figure 2:
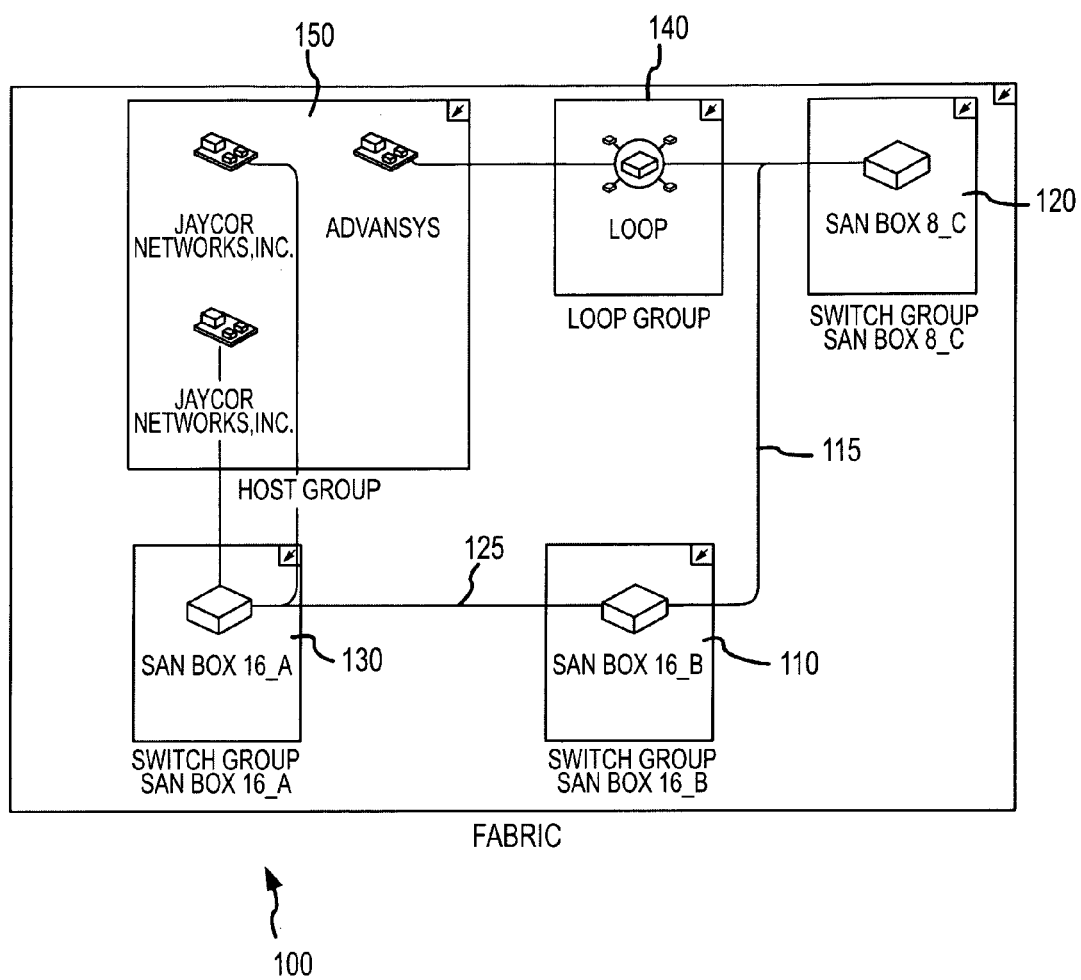
FIG. 2 illustrates an example of a network topology display including a switch node.

FIG. 2 illustrates a portion of a network topology display according to the present invention. In FIG. 2, screen display 100 includes multiple interconnected nodes. Nodes include any type of network device or network communication device, such as network hubs, servers, switches, client computers, routers, etc., or any group of interconnected devices. As shown in FIG. 2, for example, loop group node 140 represents one or more network devices interconnected over a network communication loop, e.g., a Fibre-channel FC-AL loop or other loop or network medium. Loop group node 140 is displayed as a single node rather than as the separate individual device nodes making up the loop group node to simplify the display for the viewer. Similarly, each of displayed switch group nodes 110, 120, and 130 represent a network switch device and any devices connected locally thereto. Host group node 150 is displayed in an "expanded" mode whereby individual devices in the group are displayed as individual nodes within the host group node box 150. Application Ser. No. 09/539,350, filed Mar. 31, 2000, entitled "Methods for Displaying Nodes of a Network Using a Multilayer Representation," which is hereby incorporated by reference in its entirety for all purposes, provides an example of techniques for identifying network devices, grouping the network devices into appropriate groups and displaying corresponding device and group nodes. The user may selectively expand and contract the group nodes using user input device 40 as desired. The term "node" will be used hereafter to refer to both device and group nodes to simplify the description.

As shown in FIG. 2, each node is generally connected to one or more other nodes by lines or connection paths, each including one or more segments. Each connection path between nodes in the display is preferably broken into one or more orthogonal segments. For example, the connection path 125 connecting switch node 110 to switch node 130 includes one segment, whereas the connection path 115 between switch node 110 and switch node 120 includes multiple segments. As can be seen in FIG. 2, nodes may have more than one connection to another node in the network. For example, switch node 110 includes a connection to switch node 120 and a connection to switch node 130. In general, such connections represent physical connections to a port on the node.

Figure 3:
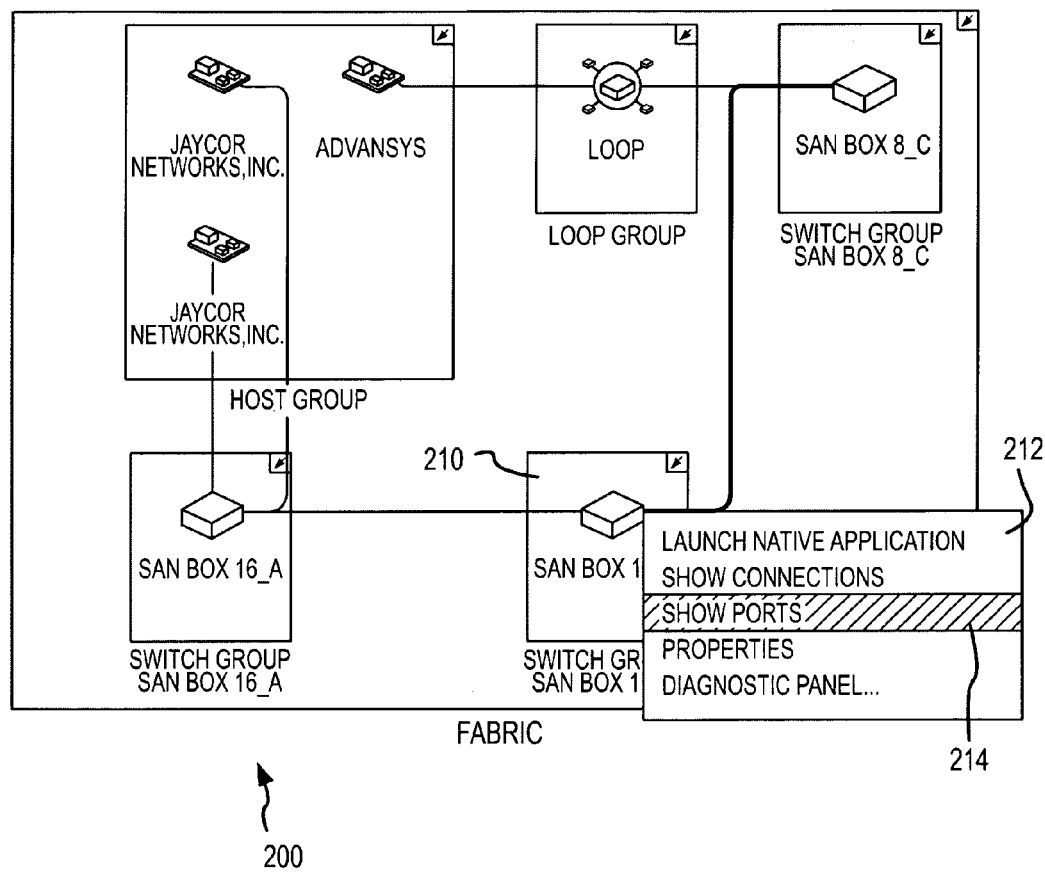
FIG. 3 illustrates an example of a pop-up window including a "show ports" option according to an embodiment of the present invention.

According to the present invention, ports of a network node and related information are displayed in response to a user selection of a particular node. In one embodiment, the user selects a node, for example, by selecting and clicking (e.g., left or right clicking) on the node on the display using a mouse or other user input device. Alternatively, the user can select from a list of nodes, e.g., provided by a toolbar menu option. Preferably a menu of options, including a "show ports" option is displayed when the user selects a node. FIG. 3 illustrates an example of a network topology display 200 including a pop-up window 212 having a "show ports" option 214 according to an embodiment of the present invention. As shown, when a user selects switch node 210, e.g., by selecting and clicking the node with a mouse device or selecting the node from a list of nodes, pop-up window 212 is displayed. Pop-up window 212 includes one or more selectable options, including an option to show ports and/or port information: "show ports" option 214. Alternatively, a selectable "show ports" option may be provided to the user in an application toolbar or some other means as is well known.

Figure 4:
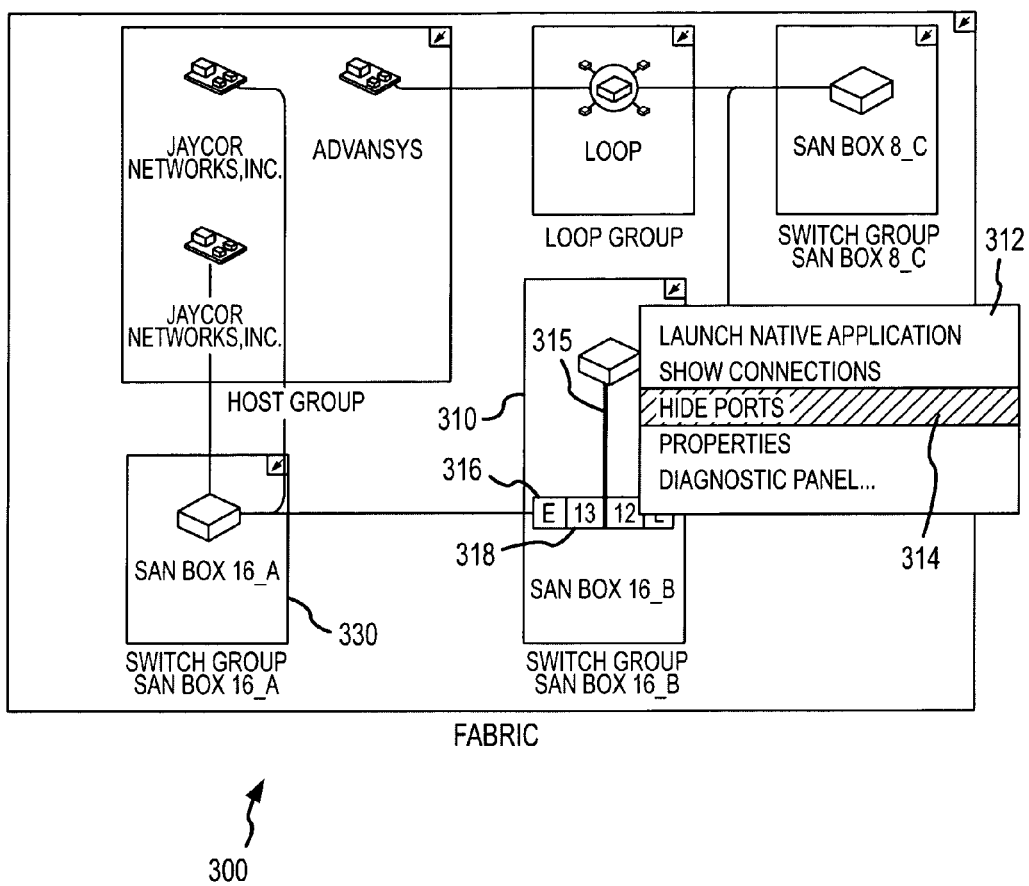
FIG. 4 illustrates an example of a port information display for a switch node and an example of a pop-up window including a "hide ports" option according to an embodiment of the present invention.

FIG. 4 illustrates an example of a network topology display 300 including displayed port information for a switch node 310. As shown in FIG. 4, switch node 310 is shown in an expanded mode and includes a connection bar 315 proximal which port information is displayed. Upon selection of the "show ports" option 214 (FIG. 2), the selected node is re-rendered as shown to include port information indicators and a connection bar. In one embodiment, only information about ports having actual connections to other network nodes is displayed. For example, as shown in FIG. 4, port information for the port on switch node 310 having a connection to switch node 330 includes the port type indicator 316 and the port number indicator 318. Alternatively, or in addition, port information for ports without actual network connections is displayed.

Examples of port information displayed include the port number, the type of port (e.g., fiber channel port, SCSI port, etc.), and port state information. In one embodiment, the operator/user is able to configure what port information is displayed. For example, the application program allows the operator to configure the port information display to show only the port type and the port number as shown in FIG. 4. According to one embodiment, the operator may configure the port information display to show only a single piece of information related to the port(s), such as only the port number, or only the port type, or any combination of two or more pieces of information related to the port(s) that a network administrator or user may desire to view.

As shown in FIG. 4, the port type indicator 316 and the port number indicator 318 are displayed proximal connection bar 315. In preferred aspects, the port information for a particular port is displayed proximal the connection bar 315 in a location indicating the relative location of the node to which the port is connected in the topology display. In one embodiment, for example, the topology display is split into two regions on either side of the selected node, and nodes in the network topology display that are connected to the selected node are identified by the elevation in the respective region. Ports of the selected node are then displayed proximal the connection bar 315 in a position indicative of the relative elevation in the topology display. For example, switch node 330 is identified in the left region of the display relative to switch node 310 (selected node) and having the lowest elevation relative to switch node 310. Accordingly, switch port information for the port connection is displayed proximal the bottom left of connection bar 15. In one embodiment, (undisplayed) place holders along connection bar 315 are used for ports that are not otherwise displayed. For example, switch node 310 may represent a contracted display of a switch group wherein the switch node includes several port connections to local devices that are not displayed in the contracted view, or switch node 310 may include several ports without connections. Thus it is convenient to include placeholders along connection bar 315 for such ports.

FIG. 4 also illustrates an example of a popup window 312 including a "hide ports" option 314 according to an embodiment of the present invention. When a user selects switch node 310 in the "show ports" mode, e.g., by selecting and clicking on the node using a mouse device or selecting the node from a list of nodes, pop-up window 312 is displayed. Pop-up window 312 includes one or more selectable options, including an option to hide ports and/or port information: "hide ports" option 314. Upon selection of the hide ports option 314, the displayed port information is removed. That is, the display is re-rendered to display the selected switch node without port information, e.g., as shown in FIG. 2. Alternatively, a selectable "hide ports" option may be provided to the user in an application toolbar or some other means as is well known.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. For example, it should be appreciated that a connection bar need not be displayed when a "show ports" option is selected and that port information may be displayed in or proximal the selected node in any location as desired. Therefore, the scope of the appended claims should be accorded the broadest interpretation so as to encompass all such modifications and similar arrangements.

What is claimed is:

1. A computer implemented method of selectively displaying port information for a network device in a network topology display comprising:
    displaying a graphical device node in the network topology display, the graphical device node representing the network device having a first connection port and a second connection port connected in the network;
    displaying in the network topology display at least one connection path of the network coupled to the graphical device node, the at least one connection path graphically representing network connections to the first connection port and the second connection port of the device; and
    selectively expanding the graphical device node in response to a user selection of the graphical device node to display an expanded device node, wherein the expanded device node concurrently displays a graphical representation of the first connection port connected to a first connection path of the network and a graphical representation of the second connection port connected to a second connection path of the network,
    wherein the expanded device node further displays port information for the first connection port and the second connection port, and the port information comprises a port connection type indicator.

2. The computer-implemented method of claim 1, wherein the graphical device node represents a network device selected from the group consisting of a switch, a hub, and a router.

3. The computer-implemented method of claim 1, wherein the port information further comprises a port number.

4. The computer-implemented method of claim 1, wherein the selectively expanding operation comprises displaying a connection bar and displaying port information proximal the connection bar for the first connection port and the second connection port.

5. The computer-implemented method of claim 4, wherein the displayed port information for each port is displayed proximal the connection bar in a location indicating the relative location of the corresponding connected network device in the network topology display.

6. The computer-implemented method of claim 1, wherein the graphical device node represents the network device and one or more devices connected to the network device.

7. A computer implemented method of selectively displaying port information for a network device in a network topology display comprising:
    displaying a graphical device node in a network topology display, the graphical device node representing the network device having a first connection port and a second connection port connected in the network;
    displaying in the network topology display at least one connection path of the network coupled to the graphical device node, the at least one connection path graphically representing network connections to the first connection port and the second connection port of the device; and
    concurrently displaying port information for the first connection port and the second connection port in response to a user selection of the graphical device node, wherein the displayed port information comprises a port number and a port connection type indicator.

8. The computer-implemented method of claim 7, wherein the graphical device node represents a network device selected from the group consisting of a switch, a hub, and a router.

9. The computer-implemented method of claim 7, wherein the concurrently displaying port information operation includes displaying a connection bar and displaying the port information proximal the connection bar for each of the first connection port and the second connection port.

10. The computer-implemented method of claim 9, wherein the displayed port information for each of the first connection port and the second connection port is displayed proximal to the connection bar in a location indicating the relative location of the corresponding connected device in the network topology display.

11. The computer-implemented method of claim 7, wherein the concurrently displaying port information operation includes displaying port information for each port of the network device having an actual connection in the network.

12. The computer-implemented method of claim 11, wherein the displayed port information for each port of the network device having an actual connection in the network is displayed proximal to a connection bar in a location indicating the relative location of the corresponding connected device in the network topology display.

13. The computer-implemented method of claim 7, wherein the user selection is performed by the user using a computer mouse.

14. The computer-implemented method of claim 7, wherein the user selection includes selecting the displayed device node with a user input device.

15. The computer-implemented method of claim 7, wherein the user selection includes selecting a show ports option from a menu of options.

16. The computer-implemented method of claim 15, further comprising displaying the menu of options in response to a user selection of the displayed device node.

17. The computer-implemented method of claim 7, further comprising removing the displayed port information from the display in response to a user selection to remove port information.

18. The computer-implemented method of claim 7, wherein the graphical device node represents the network device and one or more devices connected to the network device.

19. A computer readable medium containing instructions for controlling a computer system to selectively display device port information for a network device in a network topology display, by:
    displaying a graphical device node in the network topology display, the graphical device node representing the network device having a first connection port and a second connection port connected in a network;
    displaying in the network topology display at least one connection path of the network coupled to the graphical device node, the at least one connection path representing network connections to the first connection port and the second connection port of the network device; and
    concurrently displaying port information for the first connection port and the second connection port in response to a user selection of the graphical device node, wherein the displayed port information comprises an indication of the connection ports having an actual connection to another device in the network and the connection ports having no connection.

20. The computer readable medium of claim 19, wherein the network device comprises one of a switch, a hub and a router.

21. The computer readable medium of claim 19, wherein the network comprises a storage area network (SAN).

22. The computer readable medium of claim 19, wherein the instructions for displaying port information comprise instructions for displaying a connection bar and displaying the port information proximal the connection bar for each connection port of the network device having an actual connection in the network.

23. The computer readable medium of claim 22, wherein the instructions for displaying the port information comprise instructions for displaying the port information for each connection port of the network device having an actual connection to a connected device of the network proximal to the connection bar in a location so as to indicate the relative location of the corresponding connected device in the network topology display.

24. A method for displaying port information for a network device in a network topology display, comprising:
    displaying a network topology display comprising a graphical device node representing a network device in a physical network, the network device comprising a plurality of connection ports for connecting to other devices in the network;
    in the network topology display, displaying at least one connection path coupled to the graphical device node, the at least one connection path representing connections from the other devices to a portion of the plurality of connection ports of the network device;
    receiving a user selection of the graphical device node in the network topology display; and
    in response to the receiving of the user selection, modifying the displayed network topology display to include an expanded view of the displayed device node, wherein the expanded view concurrently displays port information for the portion of the connection ports connected to the other devices in the network and wherein the port information for the portion of the connection ports connected to the other devices in the network is displayed in locations in the expanded view indicating relative locations in the network topology display of the other devices connected to the graphical device node,
    wherein the expanded view further comprises port information for the connection ports of the device node that are not connected to the other devices in the network.

25. The method of claim 24, wherein the port information corresponding to the portion of the connection ports connected to the other devices in the network is displayed within the expanded view at elevations corresponding to elevations in the network topology display of the other devices connected to the device node.

26. The method of claim 24, wherein the port information is selected from a group of port information consisting of a port number, a port type, and a port state.

27. The method of claim 26, further comprising receiving a user-input configuration request defining a subset of the group of port information to be included in the displayed port information, and wherein the displayed port information is configured to comprise the subset.

28. A method comprising:
    displaying a network topology display including graphical device nodes and at least one connection path connecting the graphical device nodes, each graphical device node representing a network device comprising a plurality of connection ports for connecting to other devices in the network, each connection path representing at least one communicative connection between a connection port of a network device and another device in the network;
    detecting a user input event associated with the network topology display; and
    modifying the network topology display to expand one of the graphical device nodes in the network topology display responsive to the operation of detecting a user input event, the expanded graphical device node concurrently displaying a plurality of port information indicators not displayed by the displaying operation, each port information indicator representing an individual connection port of the network device represented by the graphical device node and at least one of the plurality of port information indicators representing a connection port of the network device having a communicative connection to another device in the network, wherein the expanded displayed device node displays a port information indicator for each connection port of the connection device having a communicative connection to another device in the network and for each connection port of the connection device not having a communicative connection to another device in the network.

29. A computer-readable medium having computer-executable instructions for performing a computer process, the computer process comprising:

displaying a network topology display including graphical device nodes and at least one connection path connecting the graphical device nodes, each graphical device node representing a network device comprising one or more connection ports for connecting to other devices in the network, each connection path representing at least one communicative connection between a connection port of a network device and another device in the network;

detecting a user input event associated with the network topology display; and modifying the network topology display to expand one of the graphical device nodes in the network topology display responsive to the operation of detecting a user input event, the expanded graphical device node concurrently displaying a plurality of port information indicators not displayed by the displaying operation, each port information indicator representing an individual connection port on the network device represented by the graphical device node, wherein at least one of the port information indicators represents an individual connection port of the network device having a communicative connection to another device in the network, wherein the expanded displayed device node displays a port information indicator for each connection port of the connection device having a communicative connection to another device in the network and for each connection port of the connection device not having a communicative connection to another device in the network.

30. The computer-readable medium of claim 29 wherein the computer process further comprises:

detecting another user input event associated with the network topology display; and modifying the network topology display to collapse the expanded graphical device node in the network topology display responsive to the operation of detecting another user input event, the collapsed graphical device node omitting display of the port information indicators.

31. The computer-readable medium of claim 29 wherein each displayed port information indicator representing a connection port having a communicative connection to another device in the network is graphically associated with a connection path representing the communicative connection.

32. The computer-readable medium of claim 29 wherein the expanded graphical device node displays a port information indicator for each connection port of the network device having a communicative connection to another device in the network.

33. The computer-readable medium of claim 29 wherein the expanded graphical device node displays port information indicators for connection ports of the network device having communicative connections to one or more other devices in the network and does not display port information indicators for connection ports of the network device not having communicative connections to one or more other devices in the network.

34. The computer-readable medium of claim 29 wherein at least one port information indicator displays a port connection type indicator.

35. The computer-readable medium of claim 29 wherein at least one port information indicator displays a port number indicator.

36. A computer-readable medium having computer-executable instructions for performing a computer process, the computer process comprising:

displaying a graphical device node in the network topology display, the graphical device node representing the network device having a first connection port and a second connection port connected in the network;

displaying in the network topology display at least one connection path of the network coupled to the graphical device node, the at least one connection path graphically representing network connections to the first connection port and the second connection port of the device; and selectively expanding the graphical device node in response to a user selection of the graphical device node to display an expanded device node, wherein the expanded device node concurrently displays a graphical representation of the first connection port connected to a first connection path of the network and a graphical representation of the second connection port connected to a second connection path of the network, wherein the expanded device node further displays port information for the first connection port and the second connection port, and the port information comprises a port connection type indicator.

37. The computer-readable medium of claim 36, wherein the graphical device node represents a network device selected from the group consisting of a switch, a hub, and a router.

38. The computer-readable medium of claim 36, wherein the port information further comprises a port number.

39. The computer-readable medium of claim 36, wherein the selectively expanding operation comprises displaying a connection bar and displaying port information proximal the connection bar for the first connection port and the second connection port.

40. The computer-readable medium of claim 39, wherein the displayed port information for each port is displayed proximal the connection bar in a location indicating the relative location of the corresponding connected network device in the network topology display.

41. The computer-readable medium of claim 36, wherein the graphical device node represents the network device and one or more devices connected to the network device.

42. A computer-readable medium having computer-executable instructions for performing a computer process, the computer process comprising:

displaying a graphical device node in a network topology display, the graphical device node representing the network device having a first connection port and a second connection port connected in the network;

displaying in the network topology display at least one connection path of the network coupled to the graphical device node, the at least one connection path graphically representing network connections to the first connection port and the second connection port of the device; and concurrently displaying port information for the first connection port and the second connection port in response to a user selection of the graphical device node, wherein the displayed port information comprises a port number and a port connection type indicator.

43. The computer-readable medium of claim 42, wherein the graphical device node represents a network device selected from the group consisting of a switch, a hub, and a router.

44. The computer-readable medium of claim 42, wherein the concurrently displaying port information operation includes displaying a connection bar and displaying the port information proximal the connection bar for each of the first connection port and the second connection port.

45. The computer-readable medium of claim 44, wherein the displayed port information for each of the first connection port and the second connection port is displayed proximal to the connection bar in a location indicating the relative location of the corresponding connected device in the network topology display.

46. The computer-readable medium of claim 42, wherein the concurrently displaying port information operation includes displaying port information for each port of the network device having an actual connection in the network.

47. The computer-readable medium of claim 46, wherein the displayed port information for each port of the network device having an actual connection in the network is displayed proximal to a connection bar in a location indicating the relative location of the corresponding connected device in the network topology display.

48. The computer-readable medium of claim 42, wherein the user selection includes selecting a show ports option from a menu of options.

49. The computer-readable medium of claim 48, further comprising displaying the menu of options in response to a user selection of the displayed device node.

50. The computer-readable medium of claim 42, further comprising removing the displayed port information from the display in response to a user selection to remove port information.

51. The computer-readable medium of claim 42, wherein the graphical device node represents the network device and one or more devices connected to the network device.

52. A computer implemented method of selectively displaying port information for a network device in a network topology display comprising:

displaying a graphical device node in the network topology display, the graphical device node representing the network device having a first connection port and a second connection port connected in a network;

displaying in the network topology display at least one connection path of the network coupled to the graphical device node, the at least one connection path representing network connections to the first connection port and the second connection port of the network device; and concurrently displaying port information for the first connection port and the second connection port in response to a user selection of the graphical device node, wherein the displayed port information comprises an indication of the connection ports having an actual connection to another device in the network and the connection ports having no connection.

53. The computer-implemented method of claim 52, wherein the network device comprises one of a switch, a hub and a router.

54. The computer-implemented method of claim 52, wherein the network comprises a storage area network (SAN).

55. The computer-implemented method of claim 52, wherein the instructions for displaying port information comprise instructions for displaying a connection bar and displaying the port information proximal the connection bar for each connection port of the network device having an actual connection in the network.

56. The computer-implemented method of claim 55, wherein the instructions for displaying the port information comprise instructions for displaying the port information for each connection port of the network device having an actual connection to a connected device of the network proximal to the connection bar in a location so as to indicate the relative location of the corresponding connected device in the network topology display.

57. A computer-readable medium having computer-executable instructions for performing a computer process, the computer process comprising:

displaying a network topology display comprising a graphical device node representing a network device in a physical network, the network device comprising a plurality of connection ports for connecting to other devices in the network;

in the network topology display, displaying at least one connection path coupled to the graphical device node, the at least one connection path representing connections from the other devices to a portion of the plurality of connection ports of the network device;

receiving a user selection of the graphical device node in the network topology display; and in response to the receiving of the user selection, modifying the displayed network topology display to include an expanded view of the displayed device node, wherein the expanded view concurrently displays port information for the portion of the connection ports connected to the other devices in the network and wherein the port information for the portion of the connection ports connected to the other devices in the network is displayed in locations in the expanded view indicating relative locations in the network topology display of the other devices connected to the graphical device node, wherein the expanded view further comprises port information for the connection ports of the device node that are not connected to the other devices in the network.

58. The computer-readable medium of claim 57, wherein the port information corresponding to the portion of the connection ports connected to the other devices in the network is displayed within the expanded view at elevations corresponding to elevations in the network topology display of the other devices connected to the device node.

59. The computer-readable medium of claim 57, wherein the port information is selected from a group of port information consisting of a port number, a port type, and a port state.

60. The computer-readable medium of claim 59, further comprising receiving a user-input configuration request defining a subset of the group of port information to be included in the displayed port information, and wherein the displayed port information is configured to comprise the subset.

* * * * *